United States Patent
Singh

(10) Patent No.: US 7,630,991 B2
(45) Date of Patent: Dec. 8, 2009

(54) COMPILING JOIN PATTERNS USING SOFTWARE TRANSACTIONAL MEMORIES

(75) Inventor: Satnam Singh, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 650 days.

(21) Appl. No.: 11/260,789

(22) Filed: Oct. 27, 2005

(65) Prior Publication Data

US 2007/0101314 A1    May 3, 2007

(51) Int. Cl.
*G06F 7/00* (2006.01)
*G06F 17/00* (2006.01)

(52) U.S. Cl. ........................ 707/100; 707/101
(58) Field of Classification Search .................. None
See application file for complete search history.

(56) References Cited

U.S. PATENT DOCUMENTS

| | | | | |
|---|---|---|---|---|
| 5,961,639 A * | 10/1999 | Mallick et al. | ............... | 712/242 |
| 6,105,119 A * | 8/2000 | Kerr et al. | ............... | 711/219 |
| 6,640,249 B1 * | 10/2003 | Bowman-Amuah | ......... | 709/228 |
| 6,715,145 B1 * | 3/2004 | Bowman-Amuah | ......... | 718/101 |
| 6,842,906 B1 * | 1/2005 | Bowman-Amuah | ......... | 719/330 |
| 7,289,964 B1 * | 10/2007 | Bowman-Amuah | ............ | 705/1 |
| 7,293,143 B1 * | 11/2007 | Shavit et al. | ................. | 711/147 |
| 2001/0056420 A1 * | 12/2001 | Steele et al. | .................... | 707/8 |
| 2002/0147611 A1 * | 10/2002 | Greene et al. | .................. | 705/1 |
| 2003/0058277 A1 * | 3/2003 | Bowman-Amuah | ......... | 345/765 |
| 2004/0015642 A1 * | 1/2004 | Moir et al. | ...................... | 711/1 |
| 2005/0086451 A1 * | 4/2005 | Yates et al. | .................... | 712/32 |
| 2005/0120036 A1 * | 6/2005 | Verma et al. | ................. | 707/100 |
| 2005/0138085 A1 * | 6/2005 | Verma et al. | ................. | 707/202 |
| 2005/0240621 A1 * | 10/2005 | Robertson et al. | ........... | 707/102 |
| 2006/0085591 A1 * | 4/2006 | Kumar et al. | ............... | 711/113 |
| 2006/0173885 A1 * | 8/2006 | Moir et al. | ................... | 707/101 |
| 2007/0028056 A1 * | 2/2007 | Harris | ........................ | 711/150 |

* cited by examiner

*Primary Examiner*—Mohammad Ali
*Assistant Examiner*—Angelica Ruiz
(74) *Attorney, Agent, or Firm*—Woodcock Washburn LLP

(57) ABSTRACT

Join patterns may be compiled using software transactional memories (STM's) without the use of locks or other low level constructs. In particular, any number of STM threads may each perform a corresponding change set on a corresponding channel set. Each such STM thread may perform its corresponding change set by acquiring non-exclusive access to its corresponding channel set. Once each of the STM threads has performed its corresponding change set, a comparison is made to determine whether any two or more of the change sets are inconsistent with one another. The consistent change sets may be committed to memory. The inconsistent change sets may be either committed or rolled back.

4 Claims, 9 Drawing Sheets

COMPILING JOIN PATTERNS USING SOFTWARE TRANSACTIONAL MEMORIES

BACKGROUND

Join patterns have recently become popular as an approach for providing a higher level synchronization construct for concurrent programming. In particular, join patterns enable a program to atomically capture a set of values from a number of channels or ports. The term "atomic," as used herein, refers to the ability to commit an entire set of values or to not commit (i.e. "rollback") an entire set of values. Put more simply, the atomically captured values are handled together as a group and not on an individual basis. Atomically capturing the values enables safe concurrent execution by preventing another process from interfering with the acquisition of values from multiple channels.

Conventional techniques for implementing join patterns involve building automata using low level constructs such as locks. Such low level constructs are difficult to program, are error prone, and suffer from exponential performance degradation. In particular, the use of locks may result in performance deadlocks, such as when a first thread locks a first channel and requests access to a second channel, while a second thread simultaneously locks the second channel and requests access to the first channel. Additionally, locks are designed based on a worst case or "negative" approach. Specifically, locks are implemented to protect multiple threads from accessing and changing a channel at the same time, thereby resulting in inconsistencies. However, if only a single thread requires access to a channel, then locking the channel is an inefficient operation that raises complexity and slows performance while providing minimal benefits.

SUMMARY

Join patterns may be compiled using software transactional memories (STM's) without the explicit use of locks or other low level constructs. In particular, any number of STM threads may each perform a corresponding change set on a corresponding channel set. Each such STM thread may perform its corresponding change set by acquiring non-exclusive access to its corresponding channel set. Once each of the STM threads has performed its corresponding change set, a comparison is made to determine whether any two or more of the change sets are inconsistent with one another. The consistent change sets may be committed to memory. The inconsistent change sets may be either committed or rolled back.

By employing non-exclusive access to channels, the STM based approach is easier to program and less error prone than conventional methods. Additionally, the STM based approach enables multiple threads to access the same data in parallel and, therefore, is less vulnerable to exponential performance degradation and performance deadlocks. Furthermore, unlike the pessimistic approach of conventional methods, the STM based approach is an optimistic approach that is highly efficient even in the best case scenario when there are no inconsistencies among change sets.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The illustrative embodiments will be better understood after reading the following detailed description with reference to the appended drawings, in which.

DETAILED DESCRIPTION

Figure 1:
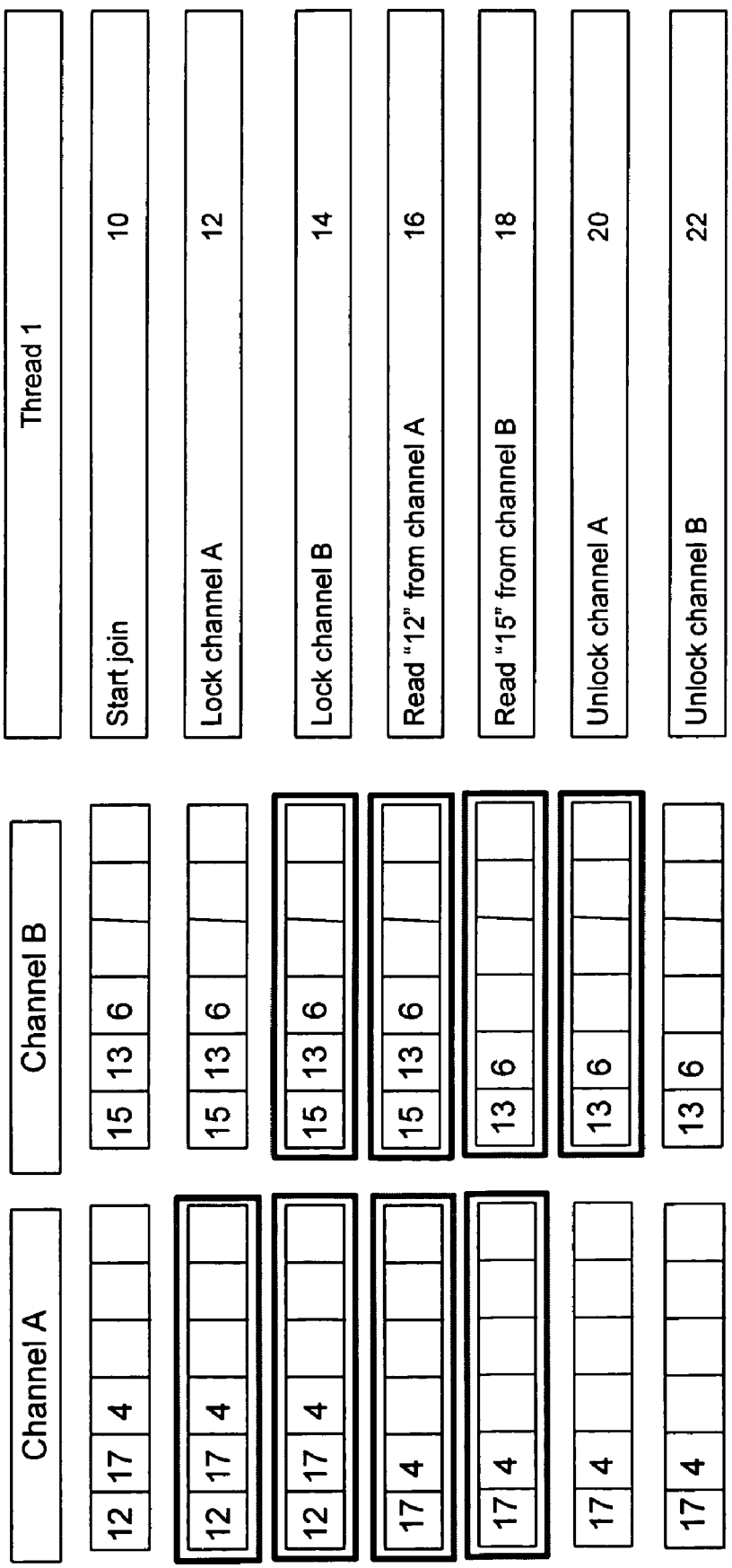
FIG. 1 depicts an exemplary prior art lock based join pattern.

An exemplary prior art lock based join pattern is depicted in FIG. 1. Acts 10-22 of FIG. 1 depict acts performed by thread 1. The join pattern depicted in FIG. 1 requires thread 1 to read values from channel A and channel B. At act 10, execution of the lock based join pattern is initiated. At act 12, thread 1 acquires a lock on channel A, and, at act 14, thread 1 acquires a lock on channel B. The locks acquired on channels A and B are depicted in FIG. 1 by bold boxes surrounding the channels for the acts during which the channels are locked. At act 16, thread 1 reads the value "12" from channel A. At act 18, thread 1 reads the value "15" from channel B. At act 20, thread 1 releases its lock on channel A, and, at act 20, thread 1 releases its lock on channel B.

During acts 12-18, channel A is inaccessible to other threads. Additionally, during acts 14-20, channel B is inaccessible to other threads. As described above, there are a number of disadvantages associated with the lock based approach depicted in FIG. 1. For example, the lock based approach ties up channel A in a pessimistic fashion. Specifically, thread 1 acquires a lock on Channel A before it attempts to acquire a lock on Channel B. Thus, if Channel B is not immediately available, thread 1 will tie up Channel A while it waits for channel B to become available. During this time, a different thread could make productive use of channel A rather than simply locking Channel A while waiting for Channel B.

In addition to its pessimistic fashion, the lock based approach is disadvantageous because it is error prone and it raises the complexity and slows the performance of join pattern execution. Furthermore, the acquisition of locks may result in performance deadlocks. For example, at act 12, thread 1 has acquired a lock on channel A and is attempting to acquire a lock on channel B. Suppose another thread 5 (not depicted in FIG. 1) simultaneously has a acquired a lock on channel B and is attempting to acquire a lock on channel A. In this scenario, threads 1 and 5 will be deadlocked, and thread 1 will be unable to move on to act 14 without the assistance of a deadlock resolution technique.

Figure 2:
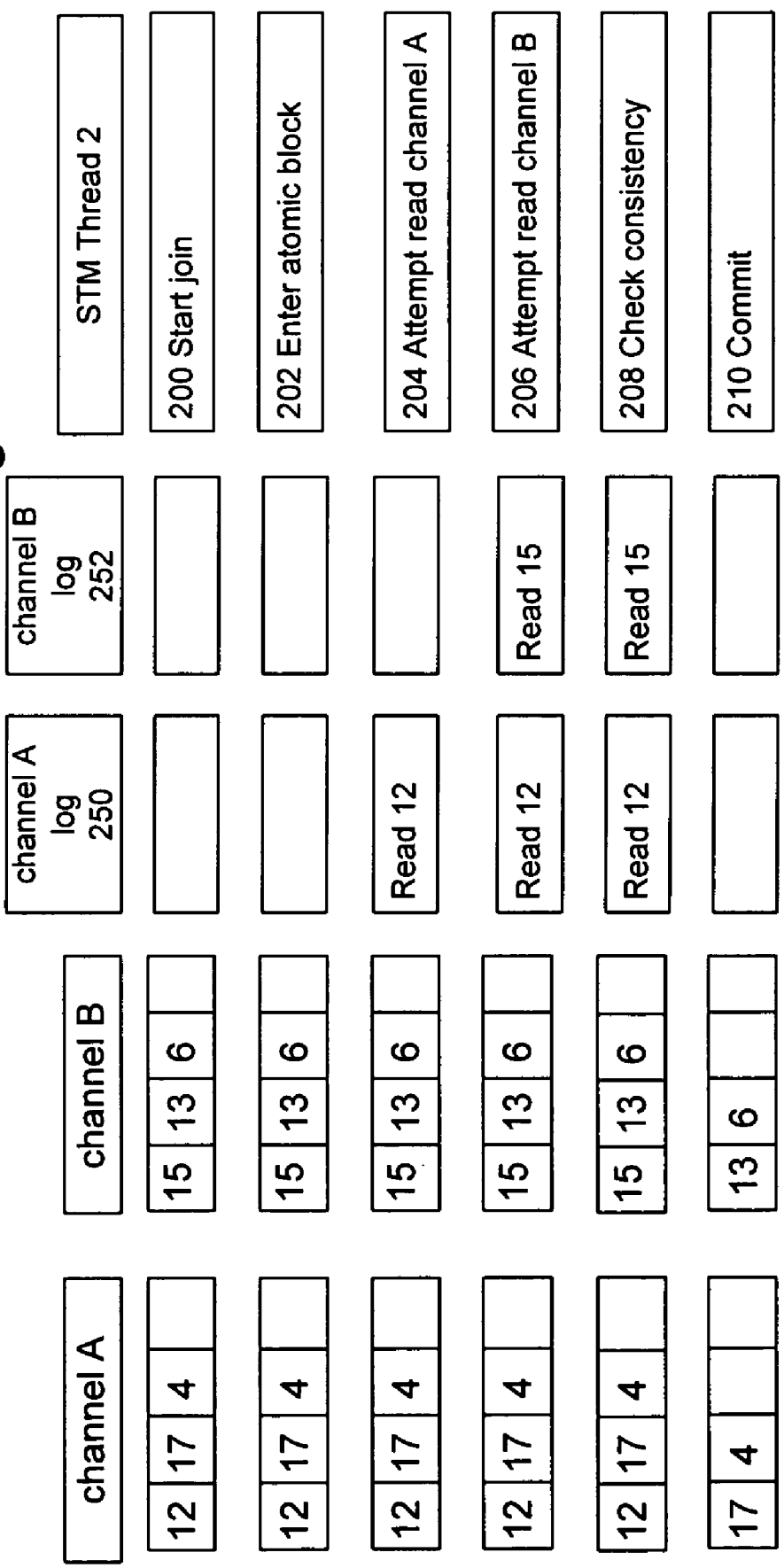
FIG. 2 depicts an exemplary STM based join pattern.

An exemplary STM based join pattern is depicted in FIG. 2. Acts 200-210 of FIG. 2 are performed by STM thread 2. The Channel A log 250 and Channel B log 252 record the changes performed on channels A and B, respectively. In the example of FIG. 2, STM thread 2 performs changes on two channels: A and B. However, STM threads may perform changes on any number of channels. Furthermore, in addition to reading data from channels, STM threads may also write data to any number of channels. Unlike the prior art technique depicted in FIG. 1, the STM based join pattern shown in FIG. 2 does not explicitly employ locks but, rather, acquires non-exclusive access to channels A and B. Although the underlying mechanism for implementing STM's may employ locks, the use of such locks is hidden from the user who programs in a "lock free" style.

At act 200, execution of the STM based join pattern is initiated. At act 202, STM thread 2 enters an atomic block, in which all changes are either committed as a unit or are rolled back as a unit. At act 204, STM thread 2 reads the value "12" from channel A. As part of act 204, STM thread 2 may need to wait for channel A to become available before it can read from channel A. At act 206, STM thread 2 reads the value "15" from channel B. As part of act 206, STM thread 2 may need to wait for channel B to become available before it can read from channel B.

At act 208, consistency is checked by comparing the changes performed by STM thread 2 (reading "12" from channel A and reading "15" from channel B) with changes performed by other STM threads executed in parallel with STM thread 2. These other parallel threads are not depicted in FIG. 2. If the changes performed by STM thread 2 are consistent with these other changes, then the changes performed by STM thread 2 are committed. The process of determining consistency will be described below with reference to FIG. 3. In the exemplary join pattern of FIG. 2, however, the changes performed by STM thread 2 are determined to be consistent with other changes, and, therefore, at act 210, the changes performed by STM thread 2 are committed to their respective channels A and B.

Figure 3:
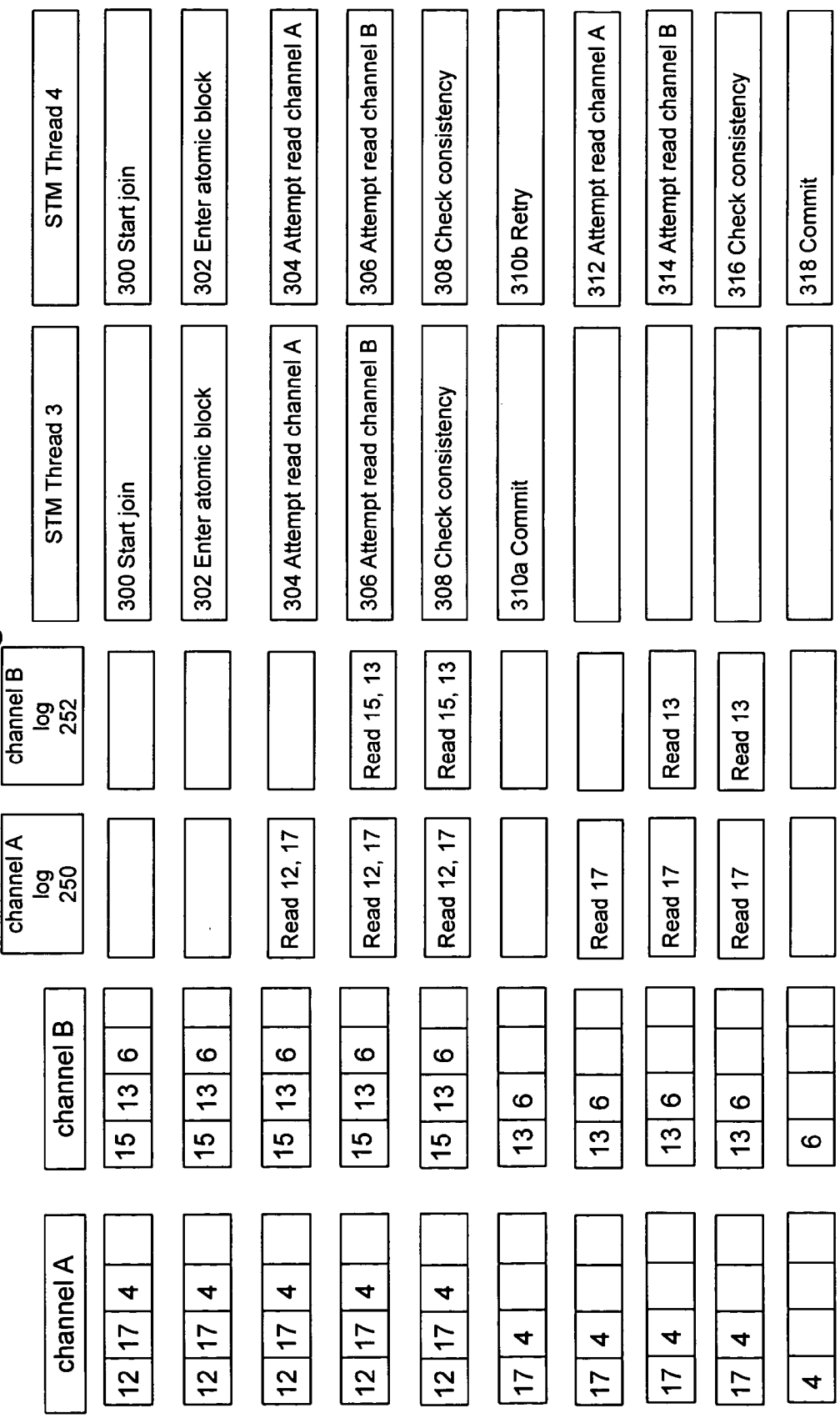
FIG. 3 depicts exemplary inconsistent STM based join patterns.

While FIG. 2 depicts only a single STM thread 2, any number of STM threads may execute in parallel with one another. FIG. 3 depicts the scenario in which two STM threads execute in parallel. Specifically, in FIG. 3, STM threads 3 and 4 both read data from the channels A and B. At act 300, the join patterns executed by STM threads 3 and 4 are initiated, and, at act 302, STM threads 3 and 4 enter an atomic block, in which all changes are either committed as a unit or are rolled back as a unit. At act 304, STM threads 3 and 4 both read values from channel A. In this example, STM thread 3 will read its data from channel A just prior to STM thread 4. Thus, STM thread 3 will read the first value "12", while STM thread 4 will read the second value "17". At act 306, STM threads 3 and 4 both read values from channel B. STM thread 3 reads the first value "15", while STM thread 4 reads the second value "13".

At act 308, consistency is checked by comparing the changes performed by STM thread 3 (reading "12" from channel A and reading "15" from channel B) with the changes performed by STM thread 4 (reading "17" from channel A and reading "13" from channel B). In this example, the changes performed by STM threads 3 and 4 are inconsistent with one another. This is because STM threads 3 and 4, while executing in parallel, have both read data from the same channels. The changes are considered inconsistent because each parallel thread should be executed as if its changes are transactional, meaning that no other thread should be able to make changes while the thread is being executed. In this case, the changes made by STM thread 3 affected the outcome of the changes made by STM thread 4. Specifically, if not for STM thread 3, STM thread 4 would have read "12" rather than "17" from channel A. Likewise, if not for STM thread 3, STM thread 4 would have read "15" rather than "13" from channel B.

Although, in this example, STM threads 3 and 4 are inconsistent with one another because they both read data from the same channels, STM threads may also be inconsistent with one another when they both attempt to write data to the same channel. Additionally, STM threads may also be inconsistent when they attempt to write data from and to read data to the same channel. Furthermore, to be inconsistent, the STM threads need not necessarily perform changes on all the same channels. Rather, performing changes to only a single common channel may be sufficient to render parallel STM threads inconsistent with one another.

After it is determined that the changes performed by STM threads 3 and 4 are inconsistent with one another, then it becomes necessary to select one of the two STM threads as a "favored" thread that will be committed while the other "disfavored" thread is rolled back. A number of different techniques may be employed to determine which of the two STM threads is the favored thread. For example, the determination may be made randomly. Additionally, the determination may be made by a user. The determination may be made either before or after the threads are found to be inconsistent with one another. For example, when a number of STM threads are executed in parallel, each thread may be pre-assigned with a rank, and the highest ranked thread among the inconsistent threads may be designated as the "favored" thread and committed, while the other inconsistent threads are designated as disfavored threads and are rolled back.

In the example shown in FIG. 3, it is determined that STM thread 3 is favored over STM thread 4. Thus, at act 310a, STM thread 3 is committed, while, at act 310b, STM thread 4 is rolled back. After being rolled back at act 310b, STM thread 4 is reattempted at acts 312-316. Specifically, at act 312, STM thread 4 reads the value "17" from channel A. At act 314, STM thread 4 reads the value "13" from channel A. At act 316, consistency is checked. However, in this example, STM thread 4 is the only remaining thread, so the changes will be consistent. At act 318, the changes performed at acts 312 and 314 are committed to their respective channels.

In the particular example of FIG. 3, STM thread 4 eventually commits at act 318 the very same changes that were rolled back at act 310b. However, this need not necessarily be the case. For example, if more than one thread is rolled back, there is a possibility that the changes eventually committed by each such thread will be different than the rolled back changes. Additionally, when more than one thread is rolled back, there is a possibility that some such threads may need to be rolled back multiple times before they are eventually committed.

Figure 4:
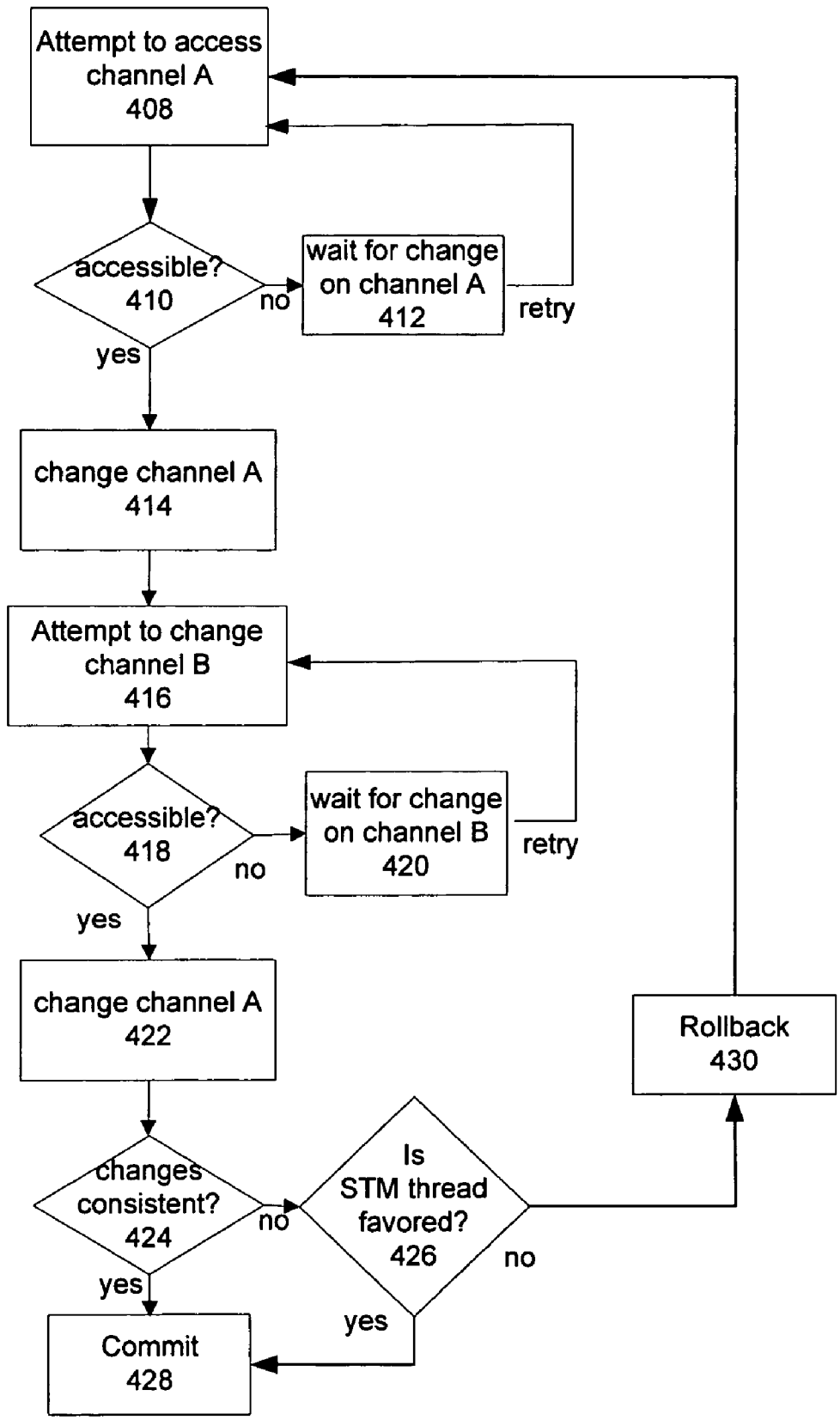
FIG. 4 depicts an exemplary method for performing an STM based join pattern.

An exemplary method for performing an STM based join pattern is depicted in FIG. 4. Just as in FIGS. 2 and 3, the STM based join pattern of FIG. 4 performs changes on two channels A and B. However, as set forth above, an STM based join patterns may be employed to make any number of changes to any number of different channels. At act 408, a change to channel A is attempted. As set forth above, the change may be either a read operation or a write operation. At act 410, it is determined whether channel A is accessible. If channel A is currently inaccessible, then, at act 412, the join pattern waits for a change on channel A. Once a change on channel A is detected, the join pattern will return to act 408 and reattempt to access channel A. If, at act 410, it is determined that channel A is accessible, then, at act 414, a change is made to channel A. At act 416, a change to channel B is attempted. At act 418, it is determined whether channel B is accessible. If channel B is currently inaccessible, then, at act 420, the join pattern will wait for a change on channel B. Once a change on channel B is detected, the join pattern will return to act 416 and reattempt to access channel B. If, at act 418, it is determined that channel B is accessible, then, at act 422, a change is made to channel B.

At act 424, it is determined whether the changes performed by the STM thread corresponding to the join pattern are consistent with changes performed by other parallel STM threads. As set forth above, if none of the other parallel STM threads is making a change to either channel A or channel B, then the changes will be consistent. However, if any of the other parallel STM threads is making a change to either channel A or channel B, then the changes will be inconsistent. If, at act 424, it is determined that the changes are consistent, then, at act 428, the changes are committed in channels A and B. If, at act 424, it is determined that the changes are inconsistent, then, at act 426, it is determined whether the corresponding STM thread is favored over the other inconsistent STM threads. If the corresponding STM thread is favored, then, at act 428, the changes are committed in channels A and B. If the corresponding STM thread is not favored, then, at act 430, the changes are rolled back and the join pattern is re-attempted.

Figure 5:
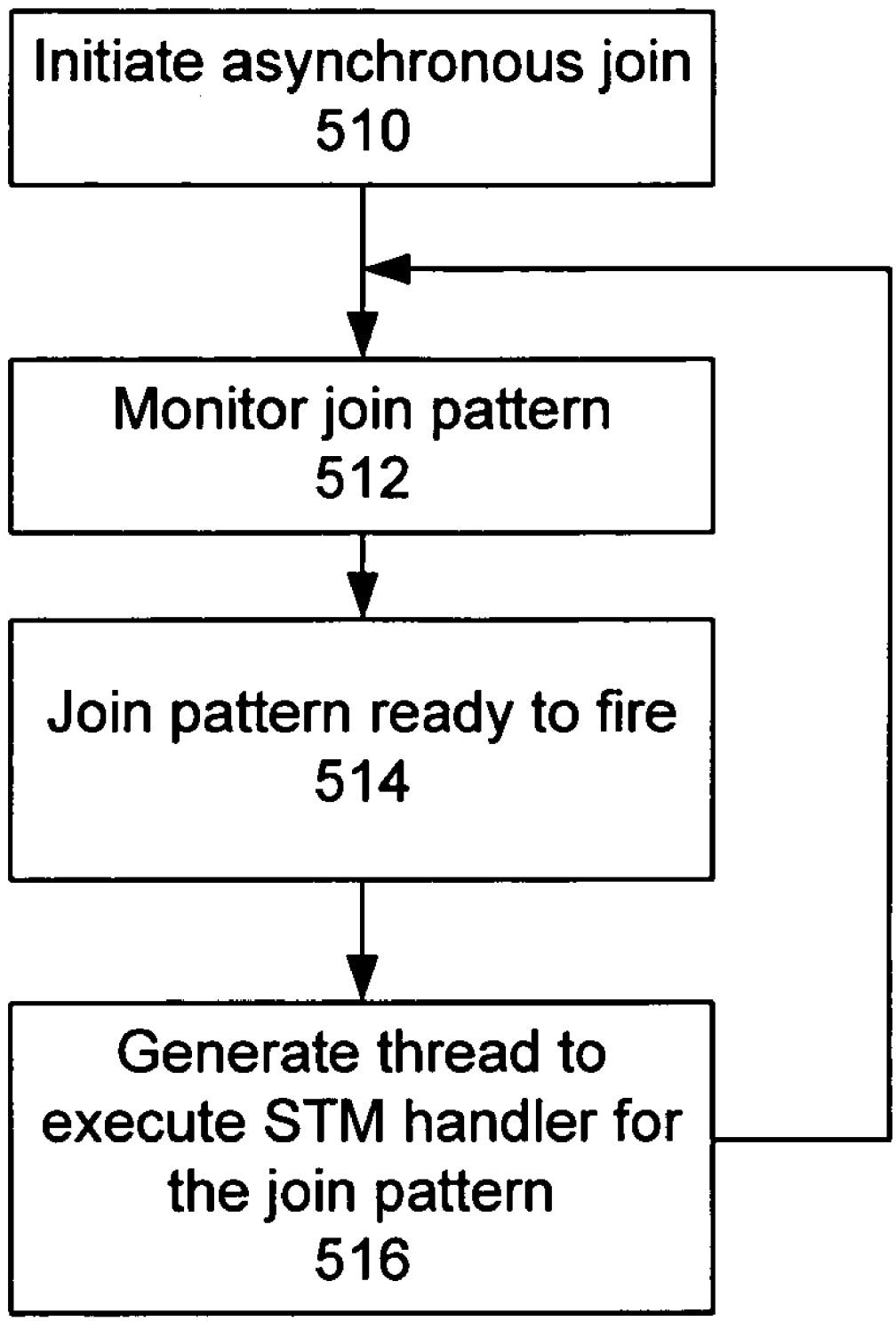
FIG. 5 depicts an exemplary method for executing an asynchronous STM based join pattern.

Some particular types of join patterns will now be described below with reference to FIGS. 5-8. One such particular type of join pattern is an asynchronous join pattern. A join pattern may be executed asynchronously by, for example, maintaining a process that monitors the join pattern to determine when the join pattern is ready to fire. A join pattern is ready to fire when its corresponding channel set becomes available. Then, when the join pattern is ready to fire, a thread may be generated to execute the STM handler for the join pattern. An exemplary method for executing an asynchronous STM based join pattern is depicted in FIG. 5. At act 510, the join pattern is initiated. At act 512, an associated process monitors the join pattern to determine when it is ready to fire. At act 514, the join pattern becomes ready to fire. At act 516, a thread is generated to execute the STM handler for the join pattern.

Figure 6:
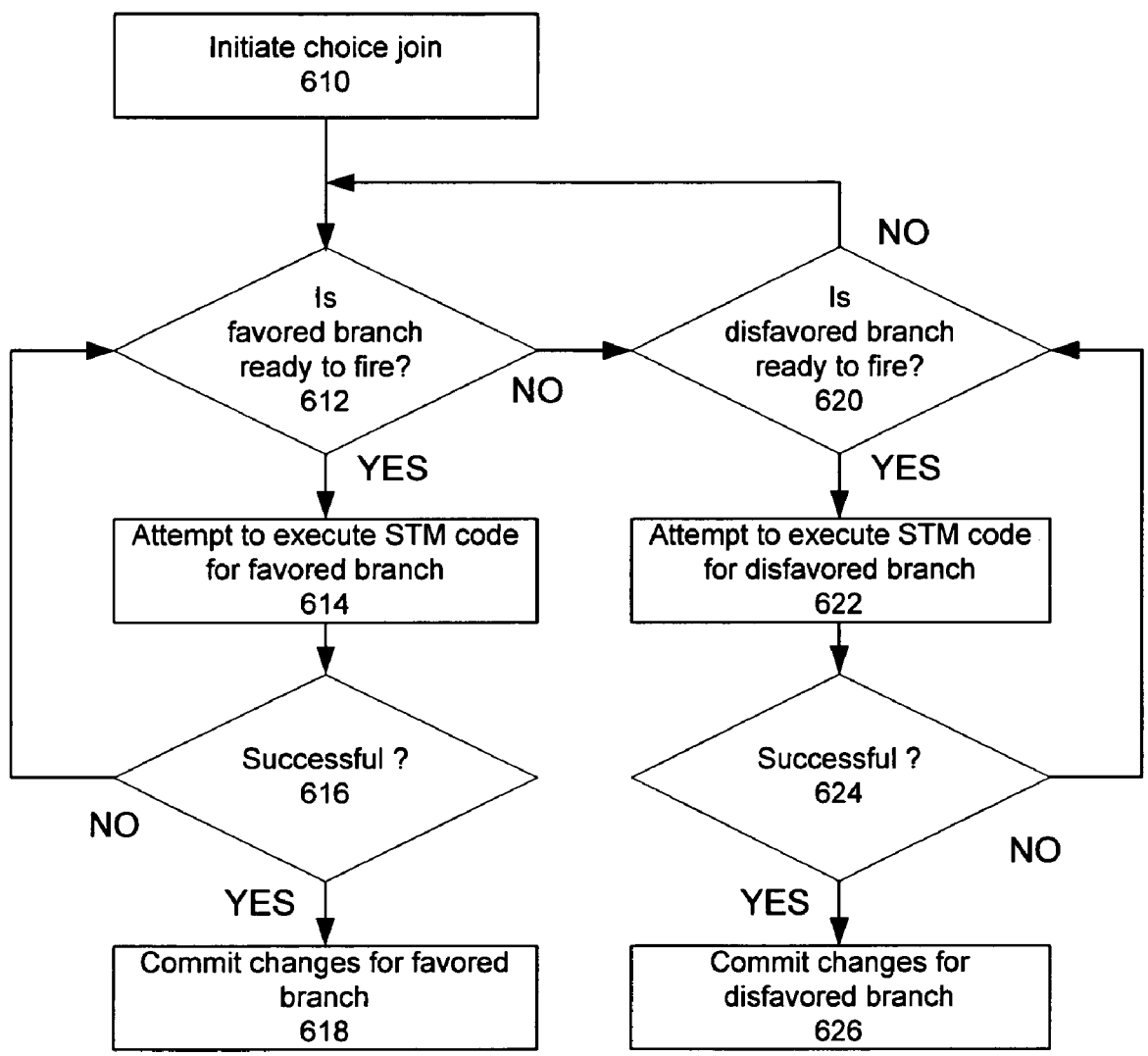
FIG. 6 depicts an exemplary method for executing an STM based choice join expression.

An exemplary method for executing an STM based choice join pattern is depicted in FIG. 6. Prior to executing the choice join pattern, one of the branches in the pattern may be designated as a favored branch, while the other branch pattern may be designated as a disfavored branch. A number of different techniques may be employed to determine which of the two branches is the favored branch. For example, the determination may be made randomly. Additionally, the determination may be made by a user. Furthermore, either a left branch or a right branch of the join pattern may always be designated as the favored branch.

At act 610, the choice pattern is initiated. At act 612, it is determined whether the favored branch is ready to fire. If the favored branch is ready to fire, then, at act 614, an attempt is made to execute STM code for the favored branch. At act 616, it is determined whether the STM code executes successfully. If the STM code executes successfully, then, at act 618, the changes corresponding to the favored branch are committed. If the STM code does not execute successfully, then the changes corresponding to the favored branch are rolled back and the method returns to act 612.

If, at act 612, it is determined that the favored branch is not ready to fire, then, at act 620, it is determined whether the disfavored branch is ready to fire. If the disfavored branch is not ready to fire, then, the join pattern is reattempted at act 612. If the disfavored branch is ready to fire, then, at act 622, an attempt is made to execute STM code for the disfavored branch. At act 624, it is determined whether the STM code executes successfully. If the STM code executes successfully, then, at act 626, the changes corresponding to the disfavored branch are committed. If the STM code does not execute successfully, then the changes corresponding to the disfavored branch are rolled back and the method returns to act 620.

In certain scenarios, such as, for example, on a computing system with multiple processors, the disfavored branch can be speculatively evaluated simultaneously while the favored branch is being evaluated at act 614. Thus, for example, if, at act 616, it is determined that the favored branch is unsuccessful, then the disfavored branch could be immediately committed if its speculative evaluation is successful. As should be appreciated, such simultaneous evaluation is not be possible in the lock based approach when the channel set for the branches is even partially overlapping.

Figure 7:
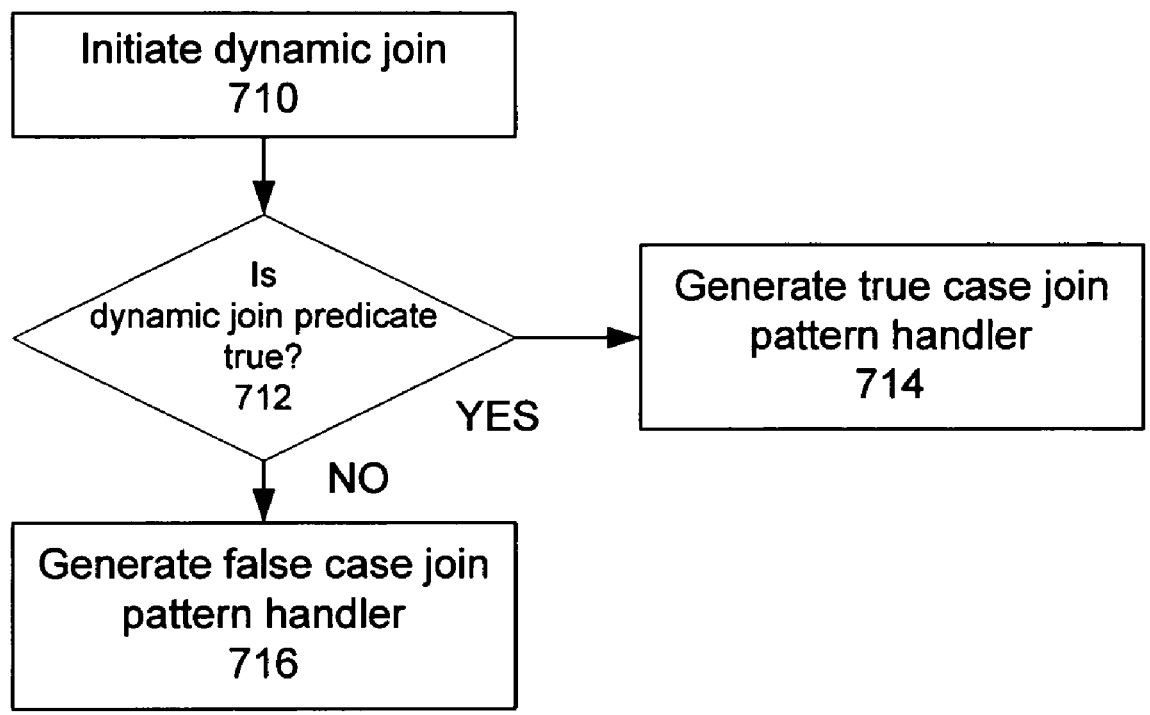
FIG. 7 depicts an exemplary method for executing an STM based dynamic join pattern.

An exemplary method for executing an STM based dynamic join pattern is depicted in FIG. 7. At act 710, the dynamic join pattern is initiated. At act 712, it is determined whether the dynamic join predicate is true or false. If the dynamic join predicate is true, then, at act 714, a handler is generated for the true case. On the other hand, if the dynamic join predicate is false, then, at act 716, a handler is generated for the false case. The true case and the false case of a single dynamic join pattern may operate over a disjoint set of channels. Moreover, both the true case and the false case may themselves include further dynamic join patterns. Accordingly, a chain of dynamic join patterns may dynamically evolve during program execution.

Figure 8:
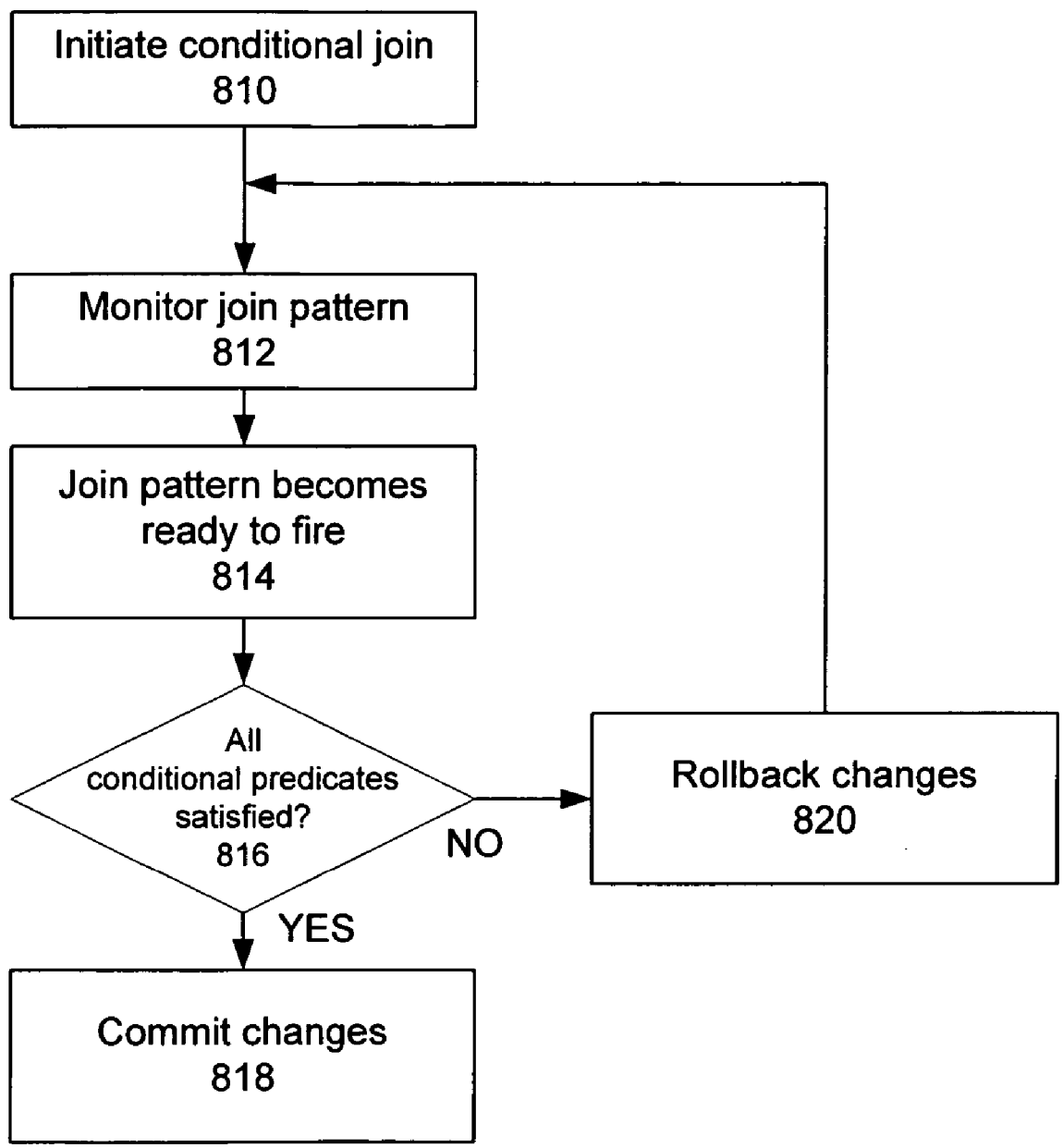
FIG. 8 depicts an exemplary method for executing an STM based conditional join pattern.

An exemplary method for handling an STM based conditional join pattern is depicted in FIG. 8. At act 810, the conditional join pattern is initiated. At act 812, an associated process monitors the join pattern to determine when the join pattern is ready to fire. At act 814, the join pattern becomes ready to fire. At act 816, it is determine whether all the conditional predicates associated with the conditional join pattern are satisfied. If all the conditional predicates are satisfied, then, at act 818, the changes associated with the join pattern are committed. If not all the conditional predicates are satisfied, then, at act 820, the changes associated with the join pattern are rolled back and the join pattern is re-attempted. As should be appreciated, the method of FIG. 8 is highly efficient when one or more other concurrent join patterns are making changes to one or more of the same channels as the conditional join pattern, because the method allows such other join patterns parallel access to the channels.

Figure 9:
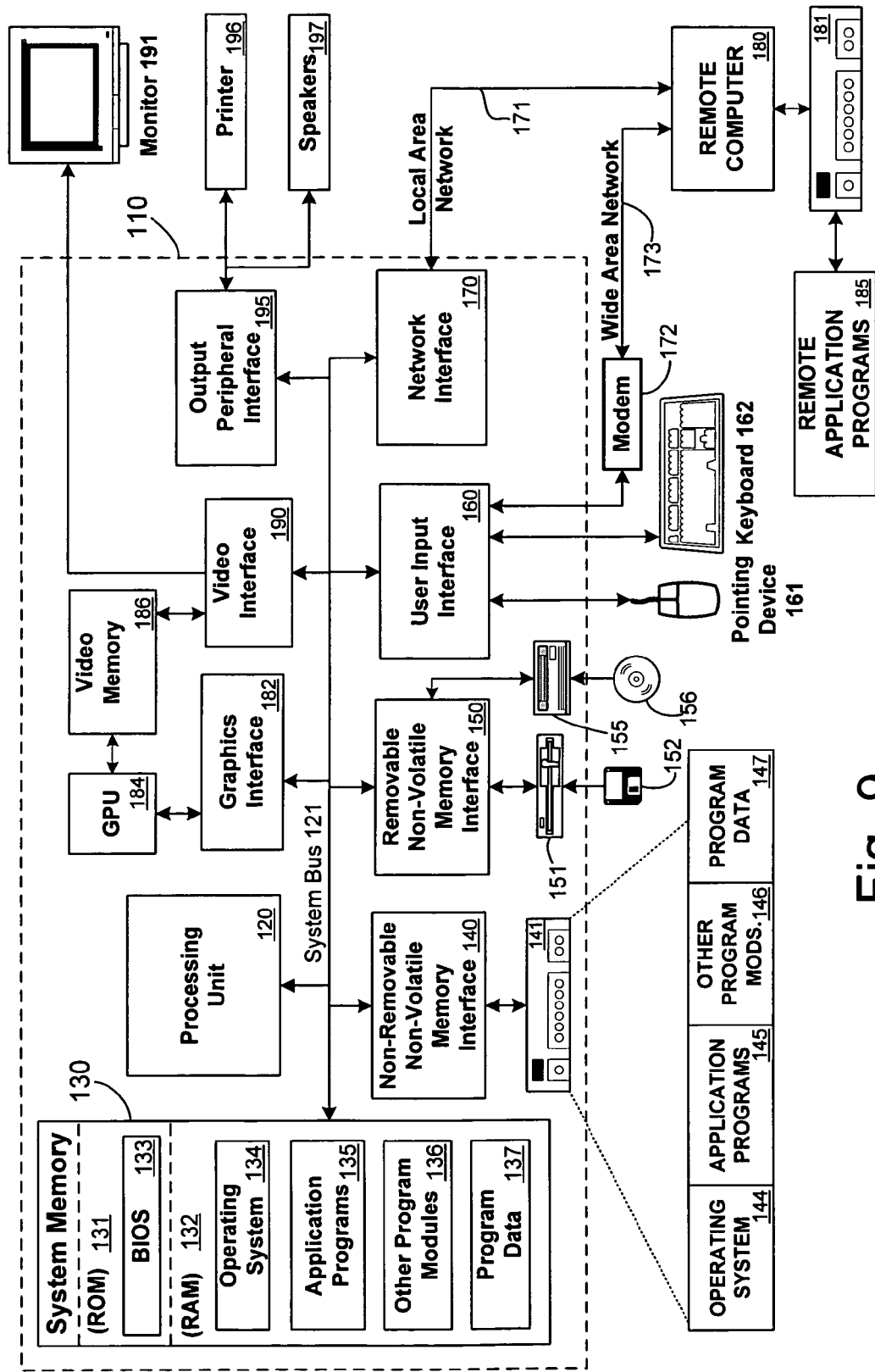
FIG. 9 is a block diagram representing an exemplary computing device.

FIG. 9 illustrates an example of a suitable computing system environment 100 in which the subject matter described above may be implemented. The computing system environment 100 is only one example of a suitable computing environment and is not intended to suggest any limitation as to the scope of use or functionality of the subject matter described above. Neither should the computing environment 100 be interpreted as having any dependency or requirement relating to any one or combination of components illustrated in the exemplary operating environment 100.

With reference to FIG. 9, computing system environment 100 includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 9 illustrates operating system 134, application programs 135, other program modules 136, and program data 137.

The computer 110 may also include other removable/non-removable, volatile/nonvolatile computer storage media. By way of example only, FIG. 9 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 9 provide storage of computer readable instructions, data structures, program modules and other data for the computer 110. In FIG. 9, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 9. The logical connections depicted in FIG. 9 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 9 illustrates remote application programs 185 as residing on memory device 181. It will be appreciated that the network connections shown are exemplary and other means of establishing a communications link between the computers may be used.

Although the subject matter has been described in language specific to the structural features and/or methodological acts, it is to be understood that the subject matter defined in the appended claims is not necessarily limited to the specific features or acts described above. Rather, the specific features or acts described above are disclosed as example forms of implementing the claims.

What is claimed:

1. A method for executing a choice join pattern that is a choice between a first join pattern branch and a second join pattern branch, the first join pattern branch performing a first set of changes on a first set of channels stored in a memory, the second join pattern branch performing a second set of changes on a second set of channels stored in the memory, the method comprising:
    (a) using a processor to designate a randomly selected one of the first join pattern branch and the second join pattern branch as a selected join pattern branch and the other of the first join pattern branch and the second join pattern branch as an unselected join pattern branch;
    (b) determining whether each channel in the set of channels operated upon by the selected join pattern branch is accessible to the selected join pattern branch;
        (c) if so, then attempting to execute a first software transactional memory code associated with the selected join pattern branch;
        (d) if not, then determining whether each channel in the set of channels operated upon by the unselected join pattern branch is accessible to the unselected join pattern branch;
            (e) if so, then attempting to execute a second software transactional memory code associated with the unselected join pattern branch; and
            (f) if not, then returning to step (b),
    wherein attempting to execute the first software transactional memory code associated with the selected join pattern branch comprises:
        if the first software transactional memory code is successfully executed, then committing the set of changes performed by the selected join pattern branch; and
        if the first software transactional memory code is not successfully executed, then rolling back the set of changes performed by the selected join pattern branch and returning to the step of determining whether each channel in the set of channels operated upon by the selected join pattern branch is accessible to the selected join pattern branch.

2. The method of claim 1, comprising attempting to execute the second software transactional memory code while simultaneously attempting to execute the first software transactional memory code.

3. A computer-readable storage medium for executing a choice join pattern that is a choice between a first join pattern branch and a second join pattern branch, the first join pattern branch performing a first set of changes on a first set of channels stored in a memory, the second join pattern branch performing a second set of changes on a second set of channels stored in the memory, the computer-readable storage medium having stored thereon instructions comprising:
    (a) using a processor to designate a randomly selected one of the first join pattern branch and the second join pattern branch as a selected join pattern branch and the other of the first join pattern branch and the second join pattern branch as an unselected join pattern branch;
    (b) determining whether each channel in the set of channels operated upon by the selected join pattern branch is accessible to the selected join pattern branch;
        (c) if so, the attempting to execute a first software transactional memory code associated with the selected join pattern branch;
        (d) if not, then determining whether each channel in the set of channels operate upon by the unselected join pattern branch is accessible to the unselected join pattern branch;
            (e) if so, then attempting to execute a second software transactional memory code associated with the unselected join pattern branch; and
            (f) if not, then returning to step (b),
    wherein attempting to execute the first software transactional memory code associated with the selected join pattern branch comprises:
        if the first software transactional memory code is successfully executed, then committing the set of changes performed by the selected join pattern branch; and
        if the first software transactional memory code is not successfully executed, then rolling back the set of changes performed by the selected join pattern branch and returning to the step of determining whether each channel in the set of channels operated upon by the selected join pattern branch is accessible to the selected join pattern branch.

4. The computer-readable storage medium of claim 3, wherein the instructions comprises attempting to execute the second software transactional memory code while simultaneously attempting to execute the first software transactional memory code.

* * * * *